UNITED STATES PATENT OFFICE.

LOUISE CLAVON HENRIOT, OF RHEIMS, FRANCE.

PHOTOGRAPHIC PLATE FOR REPRODUCING INK IMPRESSIONS.

SPECIFICATION forming part of Letters Patent No. 702,554, dated June 17, 1902.

Application filed October 25, 1901. Serial No. 80,361. (No specimens.)

*To all whom it may concern:*

Be it known that I, MADAME ALEXANDRE HENRIOT, née LOUISE CLAVON, residing at 40 Rue de l'Université, Rheims, in the Republic of France, have invented certain new and useful Improvements in Sensitive Material and Process of Making the Same; and I do hereby declare the following to be a full, clear, and exact description of the invention, such as will enable others skilled in the art to which it appertains to make and use the same.

This invention relates to a special kind of plate sensitive to light capable of being treated in such a way as to provide a surface from which a number of impressions can be taken in succession with printing-ink and to a process whereby these plates are prepared. These plates are made of glass or other suitable transparent material covered with a special kind of emulsion which is capable of receiving, by simple exposure to light which has passed through a photographic negative and by subsequent treatment, an impression from which a number of copies can be taken in printing-ink on paper or on the surface of other material.

Until now no one has succeeded in making an emulsion capable of receiving quickly by exposure to light through a photographic transparency a durable impression sufficiently defined to allow of copies being taken by an ink-roller. Also in those previous processes the gelatin films which are used for this purpose are required to be sensitized only a short time before they are used. In the plates which are prepared by my process the composition of the emulsion is such that subsequent deterioration more or less rapid is prevented. I obtain this result by using in the composition of the emulsion mercuric bromid. This is prepared by the double decomposition of potassium bromid in contact with mercuric nitrate.

The essential elements composing the emulsion after it has been sensitized are mercuric bromid and potassium bromid.

I prepare first of all a solution of gelatin by dissolving in a liter of water eighty grams of gelatin taken in the proportion of two-thirds of hard gelatin to one-third of soft gelatin. When the gelatin is quite dissolved, I add the white of one egg and I boil the mixture for an hour and a quarter. The solution after being filtered many times is left to coagulate. I then prepare the metallic bromids, mercuric bromid for preference, as follows: In a vessel immersed in a water-bath at a temperature of 40° centigrade I place of the solution above described five hundred grams and bromid of potassium forty grams and stir. In another similar vessel, also at 40° centigrade, I place the remainder of the gelatin, about six hundred grams, and mercuric nitrate in crystals, fifty grams, and stir. At the same temperature I pour the second solution into the first and stir briskly. I then add nitric acid drop by drop until the mixture becomes milky white, the alkaline mercuric bromid thus becoming acid. By decanting and filtering a mass of thick consistency is obtained which is left to coagulate in the light and air. When the substance is solidified, it is divided into small pieces, which must be washed for two hours in running water to remove the potassium nitrate, after which the water is drained away and the pieces wiped with a cloth. The emulsion thus prepared is again heated to 40° centigrade and can then be poured over the plates.

The plates, made of glass or other transparent material, are first coated with a mixture of albumen and silicate of potassium and placed horizontally to dry in a chamber heated to a temperature of from 25° to 30° centigrade freely exposed to currents of air. In this manner an adherent film will be provided, on which the emulsion is poured at the temperature of 40° centigrade, and distributed at the rate of about five cubic centimeters to a square decimeter. The plates thus doubly coated are returned to the chamber in which the temperature is maintained. At the end of about four hours the plates will be dry and the emulsion coagulated. The dried plates are then immersed for three minutes in a solution of thirty grams of potassium bichromate in a liter of water, to which fifty cubic centimeters of alcohol has been added. After the immersion the solution is drained off and the plates are left to dry in darkness. The dry finished plates, which are now very sensitive to light, are for the purpose of distribution and sale wrapped and inclosed in packets with the same precautions which are taken with other sensitive photographic plates, particularly those necessary to protect them from the light.

Plates prepared as I have just described can be without other preparation or sensitizing used at once to receive by exposure to light passing through a photographic transparency a surface from which impressions can be taken with printing-ink. The characteristic qualities of these plates are their great sensitiveness and their durability, due to the double presence in the emulsion of potassium bichromate and of mercuric bromid. This latter salt greatly enhances the sensitiveness, and at the same time on account of its antiseptic properties it prevents all fermentation and putrefaction of the gelatin, and consequently avoids any change occurring in the film.

My invention therefore consists not only of the emulsion of which I have described the composition and preparation, but of the complete plate itself—that is to say, in the combination of a rigid transparent support covered with a special emulsion, forming thus a new product which is capable of receiving directly an impression by exposure to light through a photographic negative from which prints may be taken with viscous ink.

I now wish to show how with the new plates, which may be bought in the ordinary way, one can set to work to obtain first of all an impression and afterward from it at leisure prints on paper, tissue, or any other suitable surface.

To produce the impression, one should proceed as follows: Place the negative, film upward, in an ordinary photographic-printing frame, being careful to protect with a covering any parts which are required not to appear, so that the picture which is to be printed is alone exposed to the light. The plate is then placed on the negative, the emulsion surface downward, so as to be in contact with the negative. Cover the back of the plate with a pad of several sheets of paper, close the frame, and expose to the light. The exposure to light must last only a few minutes on account of the accelerating effect of the presence of mercuric bromid in the emulsion. The progress of the exposure must be carefully observed by opening the frame in a semidark place. The gelatin background through which at first no shape of the picture could be seen will presently enable one on account of its transparency to trace the production of the picture, which gradually tinges it. When a somewhat indistint picture appears in which only white and gray patches without details can be distinguished, there will have been sufficient exposure. Should the picture appear sharply defined like a positive of a purple-gray color, the exposure has been too great. There must be only an indication of the picture such that the white parts begin to stand out from the rest. This result having been obtained, turn over the frame, open it, and expose the back of the plate to the light until the indication of the picture which could previously be seen has entirely disappeared. This exposure to the light through the back of the surface containing the picture, which is rendered possible by using a transparent substance for the rigid foundation, is of considerable importance. It has the effect of hardening the gelatin in the part just beneath the picture, and thus makes it suitable for inking, which under other circumstances would not be possible. After this take the plate to a room which is only half lighted and place it in a vessel of running water to be washed thoroughly. The operation will last from five to ten minutes, according to the temperature. It is completed when the plate attains a bluish gray color and the faint brown picture which was there before has entirely disappeared. The plate will afterward be no further affected by light. The plate may now be printed from at once or the printing may be delayed, if desired. If the printing is delayed, the plate must be washed for a longer time and then placed in a plate-rack like a negative and left to dry. If you print immediately, you proceed as follows: Take the plate out of the vessel in which it is being washed and drain it slowly and place it for five or six minutes in a vessel containing of the following solution a sufficient quantity to entirely cover it: water, forty parts; glycerin, sixty parts; total, one hundred parts. Having done this take it out, dry the back until the glass is quite clean, and secure it on a drawing-board. With a very soft sponge remove the remains of the liquid from the surface and complete the drying operation with a very clean fine linen pad. The plate will then have a dull or mat surface where the picture is imprinted and will have a polished surface around the margin.

For inking use a roller which is passed many times over an ink-table in such a way as to distribute the ink well over the table and become itself thoroughly saturated. The ink thus distributed will have a uniform tint and thickness and be free from clots. Then pass the roller over the plate, pressing it with a to-and-fro movement, so as to cover the whole of the surface.

The picture will appear gradually, becoming darker and darker as the ink-rolling proceeds. It will be obvious from the look of the picture whether it will be necessary to add ink or remove some from the roller. The surface having been inked place on it a suitable piece of paper and a pad, as is usual, and place it beneath a press. When the paper has absorbed the ink, it may be removed and the plate again inked, and so in succession any number of prints may be taken either on paper or other tissue or any other suitable substance.

I claim—

1. An emulsion for the purpose specified composed of a mixture of gelatin, mercuric bromid, and potassium bichromate, substantially as described.

2. The herein-described process of preparing sensitive coating material, which consists in dissolving a mixture of mercuric nitrate and potassium bromid in a solution of gelatin, and adding nitric acid until a milky-white substance is formed, substantially as described.

In witness whereof I have hereunto set my hand in the presence of two witnesses.

LOUISE CLAVON HENRIOT.

Witnesses:
    TRANT DIXEY,
    A. DONN.